(12) United States Patent
Lin

(10) Patent No.: US 10,099,949 B2
(45) Date of Patent: Oct. 16, 2018

(54) METHOD FOR MAKING A BIOSLUDGE-BASED BIOMASS FUEL

(71) Applicant: Chang-Ching Lin, Kaohsiung (TW)

(72) Inventor: Chang-Ching Lin, Kaohsiung (TW)

( * ) Notice: Subject to any disclaimer, the term of this patent is extended or adjusted under 35 U.S.C. 154(b) by 21 days.

(21) Appl. No.: 15/201,774

(22) Filed: Jul. 5, 2016

(65) Prior Publication Data

US 2017/0009164 A1    Jan. 12, 2017

(30) Foreign Application Priority Data

Jul. 8, 2015  (TW) .............................. 104122184 A

(51) Int. Cl.

| C10L 1/32 | (2006.01) |
|---|---|
| C02F 1/78 | (2006.01) |
| C02F 1/50 | (2006.01) |
| C02F 1/34 | (2006.01) |
| C02F 11/06 | (2006.01) |
| C02F 11/12 | (2006.01) |
| C10L 5/00 | (2006.01) |
| C10L 5/36 | (2006.01) |
| C10L 5/46 | (2006.01) |

(52) U.S. Cl.
CPC ................. *C02F 1/78* (2013.01); *C02F 1/34* (2013.01); *C02F 1/50* (2013.01); *C02F 11/06* (2013.01); *C02F 11/12* (2013.01); *C10L 5/00* (2013.01); *C10L 5/366* (2013.01); *C10L 5/46* (2013.01); *C02F 2303/06* (2013.01); *C02F 2305/023* (2013.01); *C10L 2200/0469* (2013.01); *C10L 2250/06* (2013.01); *C10L 2290/00* (2013.01); *C10L 2290/06* (2013.01); *C10L 2290/08* (2013.01); *C10L 2290/24* (2013.01); *C10L 2290/28* (2013.01); *C10L 2290/547* (2013.01); *Y02E 50/10* (2013.01); *Y02E 50/30* (2013.01)

(58) Field of Classification Search
CPC combination set(s) only.
See application file for complete search history.

(56) References Cited

U.S. PATENT DOCUMENTS

| 2003/0039729 A1 | 2/2003 | Murphy et al. | |
|---|---|---|---|
| 2008/0300131 A1* | 12/2008 | Bandosz | B01D 53/02 502/400 |
| 2010/0108567 A1* | 5/2010 | Medoff | C10G 3/00 208/49 |

FOREIGN PATENT DOCUMENTS

| CN | 101633547 B | 6/2011 |
|---|---|---|
| JP | 11-228979 A | 8/1999 |
| TW | 201042026 A | 12/2010 |
| TW | 201515710 A | 5/2015 |
| WO | 2014/059113 A1 | 4/2014 |

* cited by examiner

*Primary Examiner* — Ellen M McAvoy
*Assistant Examiner* — Chantel L Graham
(74) *Attorney, Agent, or Firm* — Husch Blackwell LLP

(57) ABSTRACT

A method for making a biosludge-based biomass fuel includes: introducing an oxidizing agent gas and an aqueous solution into a biosludge to undergo lysis of bacteria contained in a biosludge under oscillation of the oxidizing agent gas and the aqueous solution so as to form a pre-treated biosludge mixture; filtering out the oxidized biosludge from the pre-treated biosludge mixture under pressurized treatment to form biosludge solids; drying the biosludge solids; grinding the dried biosludge solids to form particulate biosludge solids; and mixing the particulate biosludge solids with an oil sludge.

8 Claims, 1 Drawing Sheet

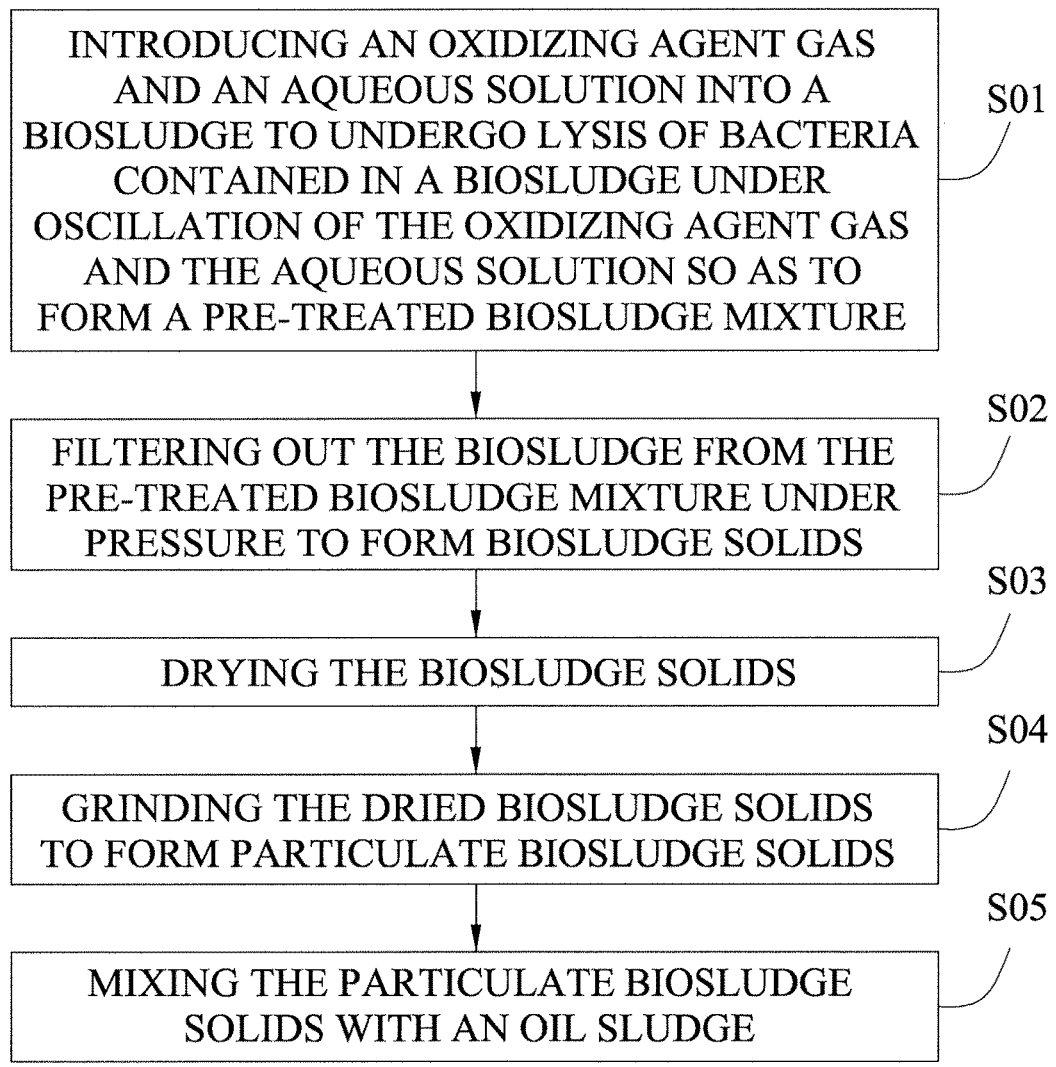

METHOD FOR MAKING A BIOSLUDGE-BASED BIOMASS FUEL

CROSS-REFERENCE TO RELATED APPLICATION

This application claims priority of Taiwanese Invention Patent Application No. 104122184, filed on Jul. 8, 2015.

FIELD

The disclosure relates to a method for making a biomass fuel, and more particularly to a method for making a biosludge-based biomass fuel.

BACKGROUND

A biosludge is a semi-solid slurry producible from a wastewater treatment in a wastewater treatment plant. The biosludge mainly includes microorganism, microorganism metabolites, and organic and inorganic materials present in wastewater. This biosludge needs to be treated prior to reuse.

A conventional fuel made from recycled waste is produced by obtaining oil sludge from recycled cutting fluids used in machining processes, mixing the oil sludge with additives, such as wood or straws, to form a mixture, and then blending the mixture with a hardener.

However, from an environmental-protection point of view, it may be desired to replace the additives, such as wood or straws, with other recycled waste materials.

SUMMARY

Therefore, an object of the disclosure is to provide a method for making a biosludge-based biomass fuel that can serve as an alternative of the conventional recycled waste-based fuel.

According to the disclosure, a method for making a biosludge-based biomass fuel includes: introducing an oxidizing agent gas and an aqueous solution into a biosludge to undergo lysis of bacteria contained in a biosludge under oscillation of the oxidizing agent gas and the aqueous solution so as to form a pre-treated biosludge mixture; filtering out the oxidized biosludge from the pre-treated biosludge mixture under pressurized treatment to form biosludge solids; drying the biosludge solids; grinding the dried biosludge solids to form particulate biosludge solids; and mixing the particulate biosludge solids with an oil sludge.

BRIEF DESCRIPTION OF THE DRAWINGS

Other features and advantages of the disclosure will become apparent in the following detailed description of the embodiment with reference to the accompanying drawing, of which:

FIG. 1 is a flow chart illustrating consecutive steps of an embodiment of a method of making a biosludge-based biomass fuel according to the disclosure.

DETAILED DESCRIPTION

Referring to FIG. 1, an embodiment of a method of making a biosludge-based biomass fuel includes steps S01 to S05.

In step S01, an oxidizing agent gas and an aqueous solution are introduced into a biosludge to undergo lysis of bacteria contained in a biosludge under oscillation of the oxidizing agent gas and the aqueous solution so as to form a pre-treated biosludge mixture. During the lysis of the bacteria present in the biosludge, the biosludge is first fractured to have a particle size ranging from 0.3 mm to 0.6 mm and an increased specific surface area, and then the oxidizing agent gas is introduced into the biosludge under a negative pressure to bring the biosludge in contact with and to react with the oxidizing agent gas under oscillation of the aqueous solution and bubbles of the oxidizing agent gas. The cells of the bacteria will be lysed by the oxidizing agent gas and the substances present in the cells will be released therefrom. In this embodiment, the oxidizing agent gas is ozone and the aqueous solution is water. In one form, the ozone may be introduced in an amount of 0.06 to 0.13 grams per 1 gram of dry weight of the biosludge.

In step S02, the oxidized biosludge is filtered out from the pre-treated biosludge mixture under pressurized treatment to form biosludge solids through filter press techniques without using a hardener. In one form, the biosludge solids obtained from filtering of the per-treated biosludge mixture may have a water content ranging from 55% to 65%.

In step S03, the biosludge solids are dried at a temperature ranging from 60° C. to 105° C. so as to obtain the dried biosludge solids that may have a water content less than 8%. The dried biosludge solids mainly include hydrocarbons and have relatively high porosity, relatively small particle size, relatively great oil absorbability and relatively high heating value, and thus, are suitable for making a biosludge-based fuel.

In step S04, the dried boisludge solids are grinded to form particulate biosludge solids so as to further enhance porosity, specific surface area, oil absorbability and heating value. In one form, the particulate biosludge solids may have a particle size less than 2 mm. Therefore, the particulate biosludge solids may be also suitable for making a biosludge-based fuel.

In step S05, the particulate biosludge solids are mixed with an oil sludge to from a biosludge-based biomass fuel. In one form, the particulate biosludge solids may be mixed with the oil sludge in a ratio ranging from 1:1 to 2:1. Selection of the oil sludge is not limited as long as the oil sludge has a required high heating value. Non-limiting examples of the oil sludge include waste oil sludge obtained from petrochemical industries, degreasing treatments, cutting oils, etc. Since both the particulate biosludge solids and the oil sludge have relative high heating values, the biosludge-based biomass fuel thus formed has a relative high heat of combustion.

In one form, the biosludge-based biomass fuel may be in the form of powder so that the amount of the biosludge-based biomass fuel can be easily adjusted when in use. Alternatively, a hardener may be added to the biosludge-based biomass fuel to make the solid-state biosludge-based biomass fuel have desirable shapes in actual applications.

In view of the foregoing, by way of the method of the disclosure, the biosludge-based biomass fuel, which incorporates the recycled biosludge with the oil sludge, is environment-friendly and has a satisfying heating value.

In the description above, for the purposes of explanation, numerous specific details have been set forth in order to provide a thorough understanding of the embodiment. It will be apparent, however, to one skilled in the art, that one or more other embodiments maybe practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A method for making a biosludge-based biomass fuel, comprising:
    introducing an oxidizing agent gas and an aqueous solution into a biosludge to undergo lysis of bacteria contained in the biosludge under oscillation of the oxidizing agent gas and the aqueous solution so as to form a pre-treated biosludge mixture;
    filtering out the oxidized biosludge from the pre-treated biosludge mixture under pressurized treatment to form biosludge solids;
    drying the biosludge solids;
    grinding the dried biosludge solids to form particulate biosludge solids; and
    mixing the particulate biosludge solids with an oil sludge.

2. The method for making a biosludge-based biomass fuel of claim 1, wherein the oxidizing agent gas is ozone and the aqueous solution is water.

3. The method for making a biosludge-based biomass fuel of claim 2, wherein the ozone is introduced in an amount of 0.06 to 0.13 grams per 1 gram of dry weight of the biosludge.

4. The method for making a biosludge-based biomass fuel of claim 1, wherein the biosludge solids obtained from filtering of the pre-treated biosludge mixture has a water content ranging from 55% to 65%.

5. The method for making a biosludge-based biomass fuel of claim 1, wherein the dried biosludge solids have a water content less than 8%.

6. The method for making a biosludge-based biomass fuel of claim 1, wherein drying of the biosludge solids is conducted at a temperature ranging from 60° C. to 105° C.

7. The method for making a biosludge-based biomass fuel of claim 1, wherein the particulate biosludge solids have a particle size less than 2 mm.

8. The method for making a biosludge-based biomass fuel of claim 1, wherein the particulate biosludge solids are mixed with the oil sludge in a ratio ranging from 1:1 to 2:1.

* * * * *